United States Patent
Yonesato et al.

(10) Patent No.: US 8,288,053 B2
(45) Date of Patent: Oct. 16, 2012

(54) NICKEL OXIDE POWDER MATERIAL FOR SOLID OXIDE FUEL CELL, PRODUCTION PROCESS THEREOF, RAW MATERIAL COMPOSITION FOR USE IN THE SAME, AND ANODE MATERIAL USING THE NICKEL OXIDE POWDER MATERIAL

(75) Inventors: Norimichi Yonesato, Niihama (JP); Hiroyuki Toya, Niihama (JP); Kazuomi Ryoshi, Niihama (JP); Tai Ito, Niihama (JP); Shoji Futaki, Niihama (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 153 days.

(21) Appl. No.: 11/990,342

(22) PCT Filed: Aug. 10, 2006

(86) PCT No.: PCT/JP2006/315807
§ 371 (c)(1),
(2), (4) Date: Feb. 12, 2008

(87) PCT Pub. No.: WO2007/020863
PCT Pub. Date: Feb. 22, 2007

(65) Prior Publication Data
US 2009/0136812 A1    May 28, 2009

(30) Foreign Application Priority Data

Aug. 18, 2005  (JP) .................. 2005-237032
Sep. 14, 2005  (JP) .................. 2005-266238
Feb. 9, 2006   (JP) .................. 2006-032544
Mar. 22, 2006  (JP) .................. 2006-078757

(51) Int. Cl.
*H01M 4/02*   (2006.01)
*H01B 1/02*   (2006.01)

(52) U.S. Cl. .................. 429/479; 252/521.2
(58) Field of Classification Search .......... 429/30, 429/479
See application file for complete search history.

(56) References Cited

U.S. PATENT DOCUMENTS
4,871,437 A * 10/1989 Marschman et al. ......... 204/291
(Continued)

FOREIGN PATENT DOCUMENTS
DE          4235514 A1    4/1994
(Continued)

OTHER PUBLICATIONS
Supplementary European Search Report issued on Oct. 11, 2010, for European Patent Application No. 06782611.5.
(Continued)

*Primary Examiner* — Patrick Ryan
*Assistant Examiner* — Brent Thomas
(74) *Attorney, Agent, or Firm* — Edwards Wildman Palmer LLP; James E. Armstrong, IV; Junko Harada (57) ABSTRACT

This invention provides a nickel oxide powder material, a production process thereof with high efficiency, a raw material composition for use in the same, and an anode material using the nickel oxide powder material. The nickel oxide powder material, when used as an anode material for a solid oxide fuel cell, can reduce heat shrinkage percentage in calcination to reduce a shrinkage difference from other component, and can suppress the occurrence of cracking, delamination, warpage and the like during calcining. Also in power generation after re-reduction after exposure of the anode once to an oxidizing atmosphere, for example, due to the disruption of the fuel supply, deterioration of microstructure of the anode can be suppressed, and the voltage drop percentage of the cell can be reduced. The nickel oxide powder material is used in an anode material constituting a solid oxide fuel cell and is characterized in that spinel compound represented by compositional formula: $NiM_2O_4$ wherein M represents a metal element is formed inside or on the surface of the nickel oxide powder or at the interface between the powder particles.

8 Claims, 1 Drawing Sheet

U.S. PATENT DOCUMENTS

| | | | |
|---|---|---|---|
| 4,883,497 A * | 11/1989 | Claar et al. | 29/623.5 |
| 2002/0056650 A1* | 5/2002 | Ray et al. | 205/387 |
| 2002/0114950 A1* | 8/2002 | Akimoto et al. | 428/403 |
| 2008/0145711 A1* | 6/2008 | Fujimoto et al. | 429/12 |

FOREIGN PATENT DOCUMENTS

| | | |
|---|---|---|
| GB | 2305169 A | 4/1997 |
| JP | 2771090 | 9/1994 |
| JP | 08-306361 | 11/1996 |
| JP | 2001-118589 | 4/2001 |
| JP | 2001-185160 | 7/2001 |
| JP | 2003-242985 | 8/2003 |
| JP | 2005-019261 | 1/2005 |
| JP | 2005-108859 | 4/2005 |
| JP | 2006-080059 | 3/2006 |
| WO | WO-99/59936 | 11/1999 |

OTHER PUBLICATIONS

O. Kesler, et al., "Improvements in Mechanical Behavior of SOFC Anodes," Mat. Res. Soc. Symp. Proc., vol. 756, FF3-10.1-FF3-10.6, 2003.

European Search Report issued in EP 12000394.2-2119, dated Mar. 29, 2012.

* cited by examiner

NICKEL OXIDE POWDER MATERIAL FOR SOLID OXIDE FUEL CELL, PRODUCTION PROCESS THEREOF, RAW MATERIAL COMPOSITION FOR USE IN THE SAME, AND ANODE MATERIAL USING THE NICKEL OXIDE POWDER MATERIAL

BACKGROUND OF THE INVENTION

The present invention relates to a nickel oxide powder material for a solid oxide fuel cell (SOFC), a production process thereof, a raw material composition for use in the same, and an anode material using it. More specifically, the present invention relates to a nickel oxide powder material, which, when used as an anode material for a solid oxide fuel cell, can reduce heat shrinkage percentage in calcination to reduce a shrinkage difference from other component, and can suppress the occurrence of cracking, delamination, warpage and the like during calcining, and also in power generation after re-reduction after exposure of the anode once to an oxidizing atmosphere, for example, due to the disruption of the fuel supply at operating temperature, a structural deterioration of the anode can be suppressed, and the voltage drop percentage of the cell can be reduced, a production process thereof with high efficiency, a raw material composition for use therein, and an anode material using it.

DESCRIPTION OF THE PRIOR ART

Recently, solid oxide fuel cell is expected as a new power generation system from both aspects of atmosphere and energy.

Generally, solid oxide fuel cell has a structure of a cathode, a solid electrolyte, and an anode, laminated in this order. Usually, as an anode, a solid electrolyte (e.g. a stabilized zirconia) comprised of nickel or a nickel oxide, is used, and as a cathode, porous $LaMnO_3$ and the like, and as a solid electrolyte, a stabilized zirconia ($ZrO_2$) and the like, are used. Here, oxygen taken from a cathode side in the form of oxide ion, and hydrogen taken from the anode side. Oxide ion through a solid electrolyte and hydrogen electrochemically react at the anode, and thereby electromotive force is generated.

As a production method of the above described solid oxide fuel cell, in the case of a flat plate, a method is conducted, wherein first of all, a part supporting a cell, generally, an electrolyte or an anode is made by tape molding or extrusion molding, then thereon a tape molded product of other constituent material is laminated, or a slurry is adhered such as by coating, and thereafter calcination is conducted. On this occasion, for the purpose of reducing production cost by simplifying production processes, usually a method is adopted wherein at least two of each of constituent materials such as an anode, an electrolyte, a cathode and the like are calcined at the same time. However, in this co-calcination method, due to differences among heat shrinkage percentages of respective materials used as an anode, an electrolyte, and a cathode, there were problems that cracking, delamination or warpage is generated on calcined products, which invites leakage of a fuel gas, or depression of power generation.

In addition, in the case of a tube type, this is made by calcining after respective slurries of materials composing an electrode and an electrolyte are coated on a tube support. On this occasion, in the case of production by a co-calcination method, unless heat shrinkage percentages of respective materials are adjusted, in the same way as the case of a flat plate, it will cause a problem of cracking, delamination, warpage or the like. For instance, in the case of using an anode as a support, when a heat shrinkage percentage of the material is low, a solid electrolyte laminated on calcining in a co-calcination method cannot bond tightly, and thus a property thereof is damaged some times.

As means for solving these problems, it is disclosed that cracking, delamination, warpage or the like due to shrinkage on calcining is suppressed by contriving a structure of an electrode such as a method where on making an electrode of a fuel cell, a thickness of an electrode is adjusted (for example, see Patent Document 1), a method where an electrode is made to have a divisional structure (for example, see Patent Document 2) and the like. However, with these methods, there were problems that heat shrinking of a composing material itself of an anode is not controlled, and in addition, width of selection of raw materials become narrowed, freedom of a composition of product is restricted and so on. On the other hand, as a composing material of an anode a nickel oxide powder containing chromium oxide, of which heat shrinkage percentage on calcining was reduced for the purpose of controlling heat shrinking of an anode material, was disclosed by the present applicant (for example, see Patent Document 3).

By the way, a solid oxide fuel cell, as compared with other types of fuel cells such as a solid polymer fuel cell or the like, has a characteristic feature that operating temperature thereof is a high temperature of 700 to 1000° C., and it exhibits high output power and high energy efficiency, and on the contrary, since it is an operation at high temperature, there is a task that durability for a long period of time is strongly demanded on a composing material thereof. Particularly, as for an anode wherein a fuel gas is supplied and which is exposed to a strong reductive atmosphere, there were problems of decrease of reaction interface (three phase boundary: TPB) of a fuel gas and an oxygen ion due to agglomeration of nickel in an electrode by operation for a long period of time, decrease of electron conductive path, or voltage drop owing to peeling-off from an electrolyte of an anode and destruction accompanied by oxidation due to the disruption of the fuel supply at operating temperature and the like.

As means for solving these problems, for instance, concerning decrease of reaction interface (three phase boundary: TPB) of a fuel gas and an oxygen ion due to agglomeration of nickel in an electrode by operation for a long period of time, or decrease of electron conductive path, an anode material wherein particle diameters of nickel or a nickel oxide and a stabilized zirconia or ratios of respective diameters were adjusted within the specified ranges, is disclosed (for example, see Patent Documents 4, 5, and 6). However, in any of these proposals, there is no reference to response to voltage drop owing to peeling-off from an electrolyte of an anode and destruction accompanied by oxidation caused by abnormality of fuel gas supplying on operation, and the like.

As apparent from the above, in conventional proposals, means for satisfying responses at the same time to the problem of heat shrinking on calcining on making an anode material and to the problem of voltage drop on operation after making an anode, have not been disclosed. From the above described situation, in a production of a solid oxide type fuel cell by a co-calcination method wherein at least two of each of constituent materials such as an anode, an electrolyte, a cathode and the like are calcined at the same time, nickel oxide powder materials are demanded wherein on using as an anode material, heat shrinkage percentage of an anode material itself is reduced, and thus the problems of cracking, delamination, warpage and the like on calcining can be solved, and further after making an anode, voltage drop of a cell can be reduced by suppressing deterioration of microstructure of an anode due to the disruption of the fuel supply at operating temperature, and the like.

[Patent Document 1] JP-A-2001-185160 (the first page and the second page);
[Patent Document 2] JP-A-2001-118589 (the first page and the second page);
[Patent Document 3] JP-A-2006-80059 (the first page and the second page);
[Patent Document 4] JP-A-2005-108859 (the first page and the second page);
[Patent Document 5] JP-A-2005-19261 (the first page and the second page);
[Patent Document 6] JP-A-8-306361 (the first page and the second page);

SUMMARY OF THE INVENTION

An object of the present invention, by considering the above-described problems, is to provide a nickel oxide powder material, which, when used as an anode material for a solid oxide fuel cell, can reduce heat shrinkage percentage in calcining to reduce a shrinkage difference from other component, and can suppress the occurrence of cracking, delamination, warpage and the like during calcining, and wherein also in power generation after re-reduction after exposure of the anode once to an oxidizing atmosphere, for example, due to the disruption of the fuel supply at operating temperature, a deterioration of microstructure, such as crack and sintering of the anode can be suppressed, and the voltage drop percentage of the cell can be reduced, a production process thereof with high efficiency, a raw material composition for use in the same, and an anode material using it.

The present inventors, to achieve the above object, have intensively studied about a nickel oxide powder material used in an anode material constituting a solid oxide fuel cell, and resultantly have found that when a nickel oxide powder material which forms spinel compound represented by a compositional formula: $NiM_2O_4$ (wherein M represents a metal element) inside or on the surface of the nickel oxide powder or at the interface between the powder particles, was used, even in power generation after its operation in re-reduction atmosphere after once to an oxidizing atmosphere, for example, due to the disruption of the fuel supply at operating temperature, deterioration of microstructure of the anode can be suppressed, and the voltage drop percentage of the cell can be reduced; particularly in the case where said spinel compound is formed on the surface of the nickel oxide powder or at the interface between the powder particles, the effect is large; and furthermore, heat shrinkage percentage of a nickel oxide powder material, which is especially large among anode composing materials, is reduced to decrease a shrinkage difference from other component, and thus occurrence of cracking, delamination, warpage and the like during calcining can be suppressed, and thus have accomplished the present invention.

Namely, according to the first invention of the present invention, a nickel oxide powder material used in an anode material constituting a solid oxide fuel cell, characterized in that spinel compound represented by a compositional formula: $NiM_2O_4$ (wherein M represents a metal element) is formed inside or on the surface of said nickel oxide powder or at the interface between the powder particles, is provided.

In addition, according to the second invention of the present invention, the nickel oxide powder material in the first invention, characterized in that said metal element (M) is at least one element selected from Al, Cr, Mn, Fe, Mo, Ga, La, or Nd, is provided.

In addition, according to the third invention of the present invention, the nickel oxide powder material in the first or the second invention, characterized in that a content of said metal element (M) is an amount sufficient for restraining deterioration of microstructure when it is used as the anode material, is provided.

Further, according to the fourth invention of the present invention, the nickel oxide powder material in the third invention, characterized in that a content ratio of said metal element (M) is 0.01 to 5 mol % relative to the total amount of nickel, is provided.

In addition, according to the fifth invention of the present invention, the nickel oxide powder material in any one of the first to the fourth invention characterized in that said spinel compound is formed on the surface of said nickel oxide powder or at the interface between the powder particles, is provided.

In addition, according to the sixth invention of the present invention, the nickel oxide powder material in any of the first to the fifth invention, characterized in that, when said metal element (M) is Mn or Fe, a heat shrinkage percentage at 1400° C. of pellets obtainable by pressure molding said nickel oxide powder material is 10 to 13%, is provided.

In addition, according to the seventh invention of the present invention, a process for producing a nickel oxide powder material according to any of the first to the sixth invention, characterized in that a raw material of nickel oxide powder and a raw material of a metal element (M) oxide powder which can form with a nickel oxide spinel compound represented by a compositional formula: $NiM_2O_4$, are dry blended in a predetermined ratio, and then they are calcined in an oxidizing atmosphere at 500 to 1200° C., is provided.

In addition, according to the eighth invention of the present invention, a process for producing a nickel oxide powder material according to any of the first to the sixth invention, characterized in that, into an aqueous solution of a nickel salt, an aqueous salt of a metal element (M) which can form with a nickel oxide spinel compound represented by a compositional formula: $NiM_2O_4$, are dissolved at a predetermined ratio, and from this aqueous solution of a nickel salt, a nickel hydroxide containing said metal element is crystallized, and thereafter said nickel hydroxide is calcined in an oxidizing atmosphere at 500 to 1200° C., is provided.

In addition, according to the ninth invention of the present invention, a raw material composition for use in a nickel oxide powder material according to any of the first to the sixth invention, characterized by comprising of nickel oxide powder or nickel hydroxide powder containing nickel of a main component and a metal element (M) which forms spinel compound represented by a compositional formula: $NiM_2O_4$ on calcination, is provided.

In addition, according to the tenth invention of the present invention, the raw material composition in the ninth invention, characterized in that said metal element (M) is at least one element selected from Al, Cr, Mn, Fe, Mo, Ga, La, or Nd, is provided.

In addition, according to the eleventh invention of the present invention, an anode material for use in a solid oxide fuel cell, comprising of solid electrolyte and a nickel oxide powder material according to any of the first to the sixth invention, is provided.

In addition, according to the twelfth invention of the present invention, the anode material for use in a solid oxide fuel cell in the eleventh invention, characterized in that a formulation ratio of a nickel oxide powder material and a solid electrolyte (a nickel oxide powder material: a solid electrolyte) is 30 to 70:70 to 30 in a mass ratio, is provided.

In addition, according to the thirteenth invention of the present invention, the anode material for use in a solid oxide fuel cell in the eleventh or twelfth invention, characterized in that a voltage drop percentage during its operation in re-reduction atmosphere after oxidization of the anode material is not higher than 5%, is provided.

The nickel oxide powder material for use in a solid oxide fuel cell according to the present invention, is a nickel oxide powder material wherein spinel compound represented by compositional formula: ($NiM_2O_4$ wherein M represents a metal element) is formed inside or on the surface of the nickel oxide powder or at the interface between the powder particles, and when this is used as an anode material, in power generation after its operation in re-reduction atmosphere after once to an oxidizing atmosphere, for example, due to the disruption of the fuel supply at operating temperature, deterioration of microstructure of the anode can be suppressed, and the voltage drop percentage of the cell can be reduced, as compared with conventional ones. Moreover, a voltage drop percentage after repeating oxidizing and re-reduction thereof can be reduced.

And thereby, in a nickel oxide powder, which has especially large heat shrinkage percentage among materials constituting an anode in the case where a metal element (M) forming the above described spinel compound is not contained, heat shrinkage percentage at a usual heating temperature or higher temperature in a calcining stage can be significantly reduced. Therefore, in an anode according to the present invention used together with other constituting materials such as a stabilized zirconia, shrinking difference with another constituting material on calcining is mitigated, and thus occurrence of cracking, delamination, warpage and the like of an anode can be prevented. Besides this, it has excellent electro-conductivity equal to or superior to conventional anode materials, and an open pore ratio of the obtainable anode also is almost the same as that of conventional anode.

As stated above, the nickel oxide powder material according to the present invention, can prevent occurrence of cracking, delamination, warpage and the like of an anode on calcining, and further on operation of a solid oxide type fuel cell using it, reliability of a cell can be improved, and thus the industrial value thereof is extremely large. And the production method according to the present invention is a useful method since it can efficiently produce the above described nickel oxide powder material.

NOTATION

1: a nickel oxide powder material
2: yttria stabilized zirconia
3: terpineol and ethyl cellulose
4: kneading
5: coating
6: sintering

DETAILED DESCRIPTION OF THE INVENTION

Hereinafter, a nickel oxide powder material for use in a solid oxide fuel cell, a production process thereof, a raw material composition for use therein, and an anode material using the nickel oxide powder material according to the present invention, are explained in detail.

1. A Nickel Oxide Powder Material for Use in a Solid Oxide Fuel Cell

A nickel oxide powder material for use in a solid oxide fuel cell according to the present invention, is a nickel oxide powder material used in an anode material constituting a solid oxide fuel cell, and is characterized in that spinel compound represented by a compositional formula: $NiM_2O_4$ (wherein M represents a metal element) is formed inside or on the surface of the above-described nickel oxide powder or at the interface between the powder particles.

Herein, the above-described metal element (M) is not especially limited, and a metal element, which forms spinel compound represented by a compositional formula: $NiM_2O_4$, is used. Among them, particularly at least one element selected from Al, Cr, Mn, Fe, Mo, Ga, La, or Nd is preferable, and Al, Cr, Mn, Fe or La is more preferable, and Cr or Mn is still more preferable.

In a nickel oxide powder material according to the present invention, it is important to make contained an oxide of a metal element (M) which restrains deterioration of structure of an anode by making form spinel compound represented by a compositional formula: $NiM_2O_4$ (wherein M represents a metal element) inside or on the surface of the above-described nickel oxide powder or at the interface between the powder particles. In addition, it is preferable to form said spinel compound on the surface of the above-described nickel oxide powder or at the interface between the powder particles, because further more effect can be obtained.

Thereby, when this nickel oxide powder material is used as an anode material, deterioration of microstructure, such as crack and growth during its operation in re-reduction atmosphere after oxidization by the disruption of the fuel supply at operating temperature or the like is suppressed, and thus a voltage drop percentage of the cell can be reduced. And a heat shrinkage percentage on calcining can be reduced, as compared with use of a nickel oxide powder which does not contain a metal element (M) forming the above described spinel compound.

The reason is as follows. When a nickel oxide powder material is produced from a raw material composition, in a calcining operation conducted as needed or in a sintering step conducted for forming an anode, by forming spinel compound represented by compositional formula: $NiM_2O_4$ on the surface of the nickel oxide powder or at the interface between the powder particles, a function of restraining sintering of nickel oxide powder each other can be afforded. Furthermore, in the case where an anode formed is exposed to a reductive atmosphere on power generation, spinel compound is reduced to decompose to become metal nickel and a metal element (M) oxide, and on this occasion not only reduction of nickel oxide is not disturbed, but also fine metal nickel is formed, and thereby such function and effect is afforded that reaction interfaces of an anode become more and performance of power generation can be improved.

Furthermore, even when an anode is exposed to an oxidative atmosphere due to the disruption of the fuel supply at operating temperature or the like of an apparatus, spinel compound is again formed, and significant deterioration of the anode structure can be restrained, and therefore even when power generation is conducted again in a reductive atmosphere, deterioration of performances can be significantly restrained. Thus, reliability of a cell performance in re-reduction atmosphere after oxidization of a cell accompanied by the disruption of the fuel supply at operating temperature, or the like can be significantly improved.

A content of the above-described metal element (M) is an amount sufficient for restraining deterioration of microstructure of the anode when it is used as the anode material. For instance, a content ratio of the above-described metal element (M) is not especially limited, and is preferably 0.01 to 5 mol %, more preferably 0.05 to 2 mol %, further preferably 0.1 to 1 mol %, relative to the total amount of nickel. Namely, when a content ratio of the metal element (M) is less than 0.01 mol % relative to the total amount of nickel, reducing effects of heat shrinkage percentage and voltage drop percentage are not sufficient. Therefore, cracking, delamination, warpage and the like of an electrode during a calcining step cannot be prevented. In addition, effect of restraining deterioration of the anode structure is neither sufficient when it is exposed to an oxidative atmosphere due to abnormal state of an apparatus, or the like. On the other hand, when a content ratio of the metal element (M) exceeds 5 mol % relative to the total amount of nickel, performance of power generation is feared to be detrimentally influenced.

For instance, a single cell is made by respectively using as an anode material comprised of nickel oxide powder containing 1 mol % of Cr relative to Ni and of yttria stabilized zirconia (YSZ), lanthanum strontium manganite (LSM) as a cathode, YSZ as an electrolyte, performance of power generation was evaluated in a three terminals method at 900° C., and as a result at current density of 0 to 0.5 A/cm$^2$, potential difference between a reference electrode and an anode was about 0.9 to 0.75 V, which was favorable. On the contrary, when in this single cell, an anode material comprised of nickel oxide powder containing more than 5 mol % of Cr relative to Ni and of YSZ, is used as an anode, voltage drop is large, and electric current can become only taken to current density of about 0.3 A/cm$^2$. One of causes thereof will be thought as follows. Namely, on power generation, a nickel oxide is reduced to form a metal nickel, but a chromium oxide exist in a form of itself, and thus an amount of a chromium oxide which has high specific resistance as compared with a metal nickel is increased, and this will give a bad influence to electric conductivity. It should be noted that, specific resistance of nickel at room temperature is $6.84 \times 10^{-6}$ Ω·cm, and specific resistance of a chromium oxide at room temperature is $10^5$ Ω·cm.

In addition, to 100 g of nickel oxide powder having an average particle diameter of 0.6 μm and a specific surface area of 3.0 m$^2$/g, 5 g of a manganese oxide (MnO$_2$) powder (a content ratio of Mn to Ni corresponds to 4.37 mol %) was added, and they were mixed with a ball mill, and thereafter were calcined at 900° C. to obtain a nickel oxide powder material containing manganese as spinel compound. By using the nickel oxide powder material obtained, an anode material was made. And performance of power generation was evaluated in a three terminals method at 900° C., and as a result at current density of 0.1, 0.2, 0.3, 0.35, 0.4, and 0.5 A/cm$^2$, potential differences between a reference electrode and an anode were respectively 0.92, 0.89, 0.83, 0.82, 0.77, and 0.74V, which were favorable.

In the above described nickel oxide powder material, a nickel oxide which is a main component is not particularly limited, and those wherein a part of nickel have been substituted by at least one element selected from Mg, Ca, Sr, Ba, Co, Cu, Mn, or Zn, can be used.

In addition, as stated above, nickel spinel compound having a spinel structure is formed at a calcining step of making an anode, and thereby sintering of a nickel oxide powder material is restrained, and a heat shrinkage percentage is significantly reduced. Therefore, a shrinkage difference from other component on calcining can be mitigated, and the occurrence of cracking, delamination, warpage and the like of an anode can be prevented.

Namely, a heat shrinkage percentage at 1400° C. of pellets obtained by pressure molding a nickel oxide powder material which does not contain a metal element (M) which forms the above described spinel compound, is about 17%. On the contrary, when the above-described metal element (M) is at least one element selected from Al, Cr, Mn, Fe, Mo, Ga, La, or Nd, a heat shrinkage percentage at 1400° C. of pellets obtainable by pressure molding a nickel oxide powder material containing these is significantly decreased and, for instance, in the case of Mn or Fe, 10 to 13% thereof can be obtained. Therefore, in an anode obtainable by using this, a shrinkage difference from other component on calcining can be mitigated, and therefore also in a calcining step of co-calcining method, occurrence of cracking, delamination, warpage and the like of an anode can be prevented. It should be noted that, a method for measuring a heat shrinkage percentage of pellets obtainable by pressure molding a nickel oxide powder material is explained in Examples.

In addition, an open pore ratio of an anode containing a predetermined amount of a metal element (M) is almost the same as a case of an anode of a nickel oxide powder material which does not contain a metal element (M) that forms the above described spinel compound. For instance, in the case of a predetermined amount of manganese, an open pore ratio thereof is 21%, and even when a ratio of addition is increased, an open pore ratio is not largely changed, and thus a bad influence to a pore necessary for an electrode is not given.

And electric conductivity (specific resistance) of an anode containing a predetermined amount of a metal element (M) is almost the same as a case of an anode of a nickel oxide powder material which does not contain a metal element (M) that forms the above described spinel compound.

Further, by forming spinel compound especially on the surface of the nickel oxide powder or at the interface between the powder particles, on power generation, fine metallic nickel is formed from the spinel compound on the surface of the nickel oxide powder or at the interface between the powder particles, and therefore many reaction interfaces are formed and electrode performance can be improved. And even when it is exposed to an oxidizing atmosphere, for example, due to abnormal gas supply of an apparatus, nickel spinel compound is regenerated on the surface of the particles or at the interface between them, and therefore effect of restraining structural deterioration of the anode is also large. Moreover, on calcining, nickel spinel compound is formed on the surface of the nickel oxide powder or at the interface between the powder particles, and therefore effect for restraining sintering of a nickel oxide powder also is large, and cracking, delamination, warpage and the like of an anode can be effectively prevented.

2. A Raw Material Composition Used in a Nickel Oxide Powder Material for Use in a Solid Oxide Fuel Cell and a Production Method Thereof As a raw material composition for use in the above described nickel oxide powder material, a nickel component of a main component and nickel oxide powder or nickel hydroxide powder containing a metal element (M) component which forms on calcination spinel compound represented by a compositional formula: NiM$_2$O$_4$ (wherein M means a metal element) are used. It should be noted that, as the above-described metal element (M), at least one element selected from Al, Cr, Mn, Fe, Mo, Ga, La, or Nd is chosen. And a content of the above-described metal element (M) is an amount sufficient for restraining structural deterioration of an anode when it is used as an anode material. For example, a content ratio of the above-described metal element (M) is adjusted at 0.01 to 5 mol % relative to the total mass of nickel so as to obtain a nickel oxide powder material having a predetermined composition.

A process for producing the above-described nickel oxide powder material is not particularly limited, and any method may be possible so long as a state where a nickel oxide (NiO) which is a main component and spinel compound represented by a compositional formula: $NiM_2O_4$ exist together, can be available.

Among the above described production processes, as a dry type production process a process is used wherein firstly in order to prepare as a composition of a raw material a nickel component of a main component and nickel oxide powder containing a metal element (M) component which forms on calcination spinel compound represented by a compositional formula: $NiM_2O_4$ (wherein M means a metal element), a nickel oxide powder material and a metal element oxide powder material which with a nickel oxide forms spinel compound represented by a compositional formula: $NiM_2O_4$, are dry blended at a predetermined ratio, and next said raw material composition is calcined in oxidizing atmosphere of such as air, or the like at 500 to 1200° C.

However, concerning the above described raw material composition, calcining at 500 to 1200° C. can be omitted depending on cases, since in a sintering step which is conducted to form an anode by using an anode material obtainable by mixing this and a solid oxide or the like, calcining at a high temperature of such as 1200 to 1500° C. is conducted to form spinel compound. That means, when the above described raw material composition is a mixture of a raw material of nickel oxide powder and a raw material of a metal element (M) oxide powder which can form spinel compound represented by a compositional formula: $NiM_2O_4$, it can also be used as the above described nickel oxide powder material as it is.

As a raw material of the above described metal element (M) oxide powder, though not especially limitative, an oxide powder of at least one element selected from Al, Cr, Mn, Fe, Mo, Ga, La, or Nd is used, and also a hydroxide, a carbonate or the like, which is changed to an oxide by calcination, can be used. Herein, a form of an oxide, a hydroxide, or a carbonate, is not especially limited, and for example, as an iron oxide, di-ferric trioxide ($Fe_2O_3$), ferrous monoxide (FeO), tri-ferric tetraoxide ($Fe_3O_4$) and the like; as an iron hydroxide, ferrous hydroxide ($Fe(OH)_2$), ferric oxide hydroxide (FeO(OH)) and the like; and further ferrous carbonate ($FeCO_3$) and the like can be utilized. As a manganese oxide, manganese dioxide ($MnO_2$), manganous monoxide (MnO), dimanganese trioxide ($Mn_2O_3$), trimanganese tetroxide ($Mn_3O_4$) and the like; as a manganese hydroxide, manganous hydroxide ($Mn(OH)_2$), manganese hydroxide ($Mn(OH)_3$) and the like; and further manganous carbonate ($MnCO_3$) can be utilized.

In addition, as purity of the above described metal element (M) oxide powder, though not especially limitative, for example, a commercially available reagent of a level of an average grade is used. And as a particle size of the above described metal element (M) oxide powder, though not especially limitative, an average particle size as measured by a laser diffraction and scattering method by using a particle diameter measuring device (Microtrac 9320-X100 made by Microtrac Inc.) is preferred to be not higher than 1 µm.

Herein, concerning a mixing ratio of the above described metal element (M) oxide, mixing is conducted so that a ratio of the metal element (M) oxide relative to the total amount of nickel may preferably be 0.01 to 5 mol % with the same reason in the case of the above-described content ratio of a metal element (M) in the total amount of nickel oxide powder material.

In the above described dry blending, a blender, a mixer, a ball mill, a sand mill, a vibrating mill or the like can be suitably used. As a blending medium, a ball made of zirconia, a ball made of various sorts of plastics such as a ball made of nylon or the like can be suitably used.

As a particle diameter of a raw material of nickel oxide powder used in the above described dry blending, though not especially limitative, an average particle diameter as measured by a laser diffraction and scattering method by using a particle diameter measuring device (Microtrac 9320-X100 made by Microtrac Inc.) is preferred to be not higher than 1 µm. In other words, when the particle diameter exceeds 1 µm, on operation, because of decrease of reaction interfaces (three phase boundary: TBP) which are formed by solid electrolyte, nickel metal, and a pore or the like, performance of power generation may be possibly influenced, which is not preferable.

Moreover, as a particle diameter of a raw material of the above described metal element (M) oxide powder, though not especially limitative, it preferably equals to or is lower than a particle diameter of a raw material of nickel oxide powder for uniform blending.

In addition, as another process for producing a nickel oxide powder material, for instance, a process of a wet type method as follows is used.

(1) To prepare as a composition of a raw material nickel hydroxide powder containing a nickel component of a main component and a metal element (M) component which forms on calcination spinel compound represented by a compositional formula: $NiM_2O_4$ (wherein M means a metal element), a water soluble salt of a metal element (M) which with a nickel oxide forms spinel compound represented by a compositional formula: $NiM_2O_4$ are dissolved into an aqueous solution of a nickel salt at a predetermined ratio, and from this aqueous solution of a nickel salt, a precursor of nickel hydroxide is crystallized. At this time, a metal element (M) also is crystallized at the same time with the crystallization of nickel hydroxide, and therefore by calcining this crystallized substance in an oxidizing atmosphere at 500 to 1200° C., nickel oxide powder material containing a metal element (M) oxide can be obtained. Herein, as a water soluble salt of a nickel salt and a metal element (M), a salt of a non-metallic element which after calcining does not exist in a nickel oxide powder is preferable, for example, a chloride is more preferable.

(2) To prepare as a composition of a raw material nickel oxide powder containing a nickel component of a main component and a metal element (M) component which forms on calcination spinel compound represented by a compositional formula: $NiM_2O_4$ (wherein M means a metal element), into an aqueous solution of a salt such as a chloride or the like of a metal element (M) which with a nickel oxide forms spinel compound represented by a compositional formula: $NiM_2O_4$, a nickel oxide powder is dispersed and mixed, and they are dried. Thereafter, a dried substance is calcined in an oxidizing atmosphere at 500 to 1200° C. At this time, for drying, an atmospheric drier, a vacuum drier, a medium flow drier, a slurry drier, a spray drier or the like can be used.

On calcination used in a process for producing the above described nickel oxide powder material, a general calciner such as a muffle furnace, a tube furnace, a pot furnace, a rotary furnace, a pusher furnace, a burner furnace or the like can be used.

Herein, as the above described calcining temperature, in the case of calcining nickel hydroxide of a precursor, conversion to a nickel oxide is possible at a temperature of not lower than 300° C., but to obtain a nickel oxide powder material which can be suitably used in an anode for use of a solid oxide fuel cell, though not especially limitative, calcination is conducted in an oxidizing atmosphere of such as air at a temperature of 500 to 1200° C., preferably at a temperature of 800 to 1200° C., wherein spinel compound can be formed. Namely, at a calcination temperature of lower than 500° C., spinel compound is not formed, and on the other hand, at a calcination temperature exceeding 1200° C., sintering proceeds too much and therefore load of pulverization becomes too large. However, depending on conditions of calcination, nickel oxide powder sinters to form particles growth or a secondary particles, and therefore it is important to determine a desirable calcination condition in accordance with performance of nickel oxide powder expected. However, particles which were once sintered can be again pulverized, and also utilized as an anode material.

Concerning a particle diameter of a nickel oxide powder material obtainable by the above described production process, though not especially limitative, an average particle size as measured by a laser diffraction and scattering method by using a particle diameter measuring device (Microtrac 9320-X100 made by Microtrac Inc.) is preferred to be not higher than 1 μm. In other words, when the particle diameter exceeds 1 μm, on operation, because of decrease of reaction interfaces (three phase boundary: TBP) which are formed by solid electrolyte, nickel metal, and a pore or the like, performance of power generation may be possibly influenced, which is not preferable.

3. An Anode Material for Use of a Solid Oxide Fuel Cell

An anode material for use of a solid oxide fuel cell according to the present invention is obtained by formulating a solid electrolyte to the above described nickel oxide powder material. For instance, when an anode for use of a solid oxide fuel cell is made by using this, the above described nickel oxide powder material, a solid electrolyte, and other constituting components are kneaded to form paste of an anode material, and after molding this, sintering is conducted in oxidizing atmosphere in a condition of 1200 to 1500° C.

Namely, as a production process of a solid oxide fuel cell, in the case of a flat plate, a method is conducted, wherein first of all, apart supporting a cell, generally, an electrolyte or an anode is made by tape molding or extrusion molding, then thereon a tape molded product of other constituent material is laminated, or a slurry is adhered by coating, and thereafter calcination is conducted. On this occasion, for the purpose of reducing production cost by simplifying production processes, usually a method is adopted wherein at least two of each of constituent materials such as an anode, an electrolyte, a cathode and the like are calcined at the same time.

In the above described anode material, a formulation ratio of a nickel oxide powder material and a solid electrolyte (a nickel oxide powder material: a solid electrolyte), though not especially limitative, is preferably 30 to 70:70 to 30, more preferably 35 to 65:65 to 35, in a mass ratio from the viewpoints of consistency of thermal expansion coefficient with another constituting material of a cell, and balances of mechanical strength and electric conductivity. And in the case of a tube type, after each slurry of material constituting an electrode and an electrolyte is coated on a tube support, calcination is conducted to produce it.

As the above described solid electrolyte, though not especially limitative, an yttria stabilized zirconia, a scandia stabilized zirconia, and an oxygen ion conductor of such as ceria wherein 10 to 35 mol % of samaria, gadolinia, yttria or the like was doped, are used. And in the case when an operation temperature is high such as 700 to 1000° C., an yttria stabilized zirconia or a scandia stabilized zirconia is more preferable.

By using an anode material described above, an anode suitable for use in a solid oxide fuel cell can be obtained.

For instance, in an anode material wherein a predetermined amount of an yttria stabilized zirconia is formulated to a nickel oxide powder material having a content ratio of a metal element (M) of 0.01 to 5 mol % relative to Ni, the anode is subjected to re-reduction after exposure of the anode once to an oxidizing atmosphere, for example, due to the disruption of the fuel supply on the way of power generation, and "a voltage drop percentage during its operation in re-reduction atmosphere after oxidization of the anode material" which represents voltage drop on power generation thereafter is suppressed to not higher than 5%.

EXAMPLES

Hereinafter, the present invention is explained in more detail by examples and comparative examples according to the present invention, but the present invention is not in the least restricted by these examples. It should be noted that, a particle diameter and a specific surface area of a powder material, analysis of a nickel oxide powder material or a raw material composition thereof, measurement of a heat shrinkage percentage, measurement of electric conductivity (specific resistance) and an open pore ratio of an anode material, and an evaluation method of performance of power generation of a single cell, as used in examples and comparative examples, are as follows.

(1) Measurement of an Average Particle Diameter of a Powder Material:

This was conducted by a laser diffraction and scattering method by using a particle diameter measuring device (Microtrac 9320-X100 made by Microtrac Inc.).

(2) Measurement of a Specific Surface Area of a Powder Raw Material:

This was conducted by a BET method using a device for measuring a specific surface area (NOVA 1000e made by Yuasa Ionics Inc.)

(3) Analysis of a Nickel Oxide Powder Material or a Raw Material Composition Thereof:

This was conducted by an ICP atomic emission spectrometric analysis method.

(4) Measurement of a Heat Shrinkage Percentage of a Nickel Oxide Powder Material or a Raw Material Composition Thereof:

Using a nickel oxide powder material or a raw material composition thereof, it was uniaxially pressure molded at a pressure of 1 t/cm² to make a cylindrical pellet having a diameter of 5 mm. A heat shrinkage percentage of this pressure molded pellet was measured by using a TMA device (made by Bruker AXS K.K., Type TMA-4000S) Specifically, while introducing air at 0.3 liter/min, a pellet was heated at a rate of raising temperature of 10° C./min, and a shrinkage percentage in a direction of thickness at 1400° C. was measured.

(5) Making a Sample for Measurement of an Anode Material, and Measurement of Electric Conductivity (Specific Resistance) and an Open Pore Ratio Thereof:

As a method for making samples for measuring electric conductivity and an open pore ratio of an anode material, an anode material is obtained by weighing a nickel oxide powder material or a raw material composition thereof and an yttria stabilized zirconia so that a mass ratio is 65:35. Thereto, ethyl cellulose is added at 5% by mass relative to the total mass of an anode material, and thereafter they are mixed to become uniform with a mortar. 5 g of this mixed powder is taken separately, and it is uniaxially pressure molded at a pressure of 1 t/cm$^2$ to make a cylindrical pellet having a diameter of 25 mm. Next, by using this pressure molded pellet, it is heated at a rate of raising temperature of 10° C./min, and calcination is conducted in a condition of 1500° C. for 3 hours. Then, cutting out of a rectangular parallelepiped of about 3 mm×3 mm×25 mm is conducted from the sintered product, and this was subjected to reduction in an atmosphere of 4% of hydrogen and 96% of nitrogen in a condition of 950° C. for 3 hours to obtain a sample for measurement.

Measurement of electric conductivity was conducted, by a direct current four terminals method using Potentio•Galvanostat (made by Advanced Measurement Technology inc. Solartron Analytical, Type SI-1287), after the sample for measurement obtained was provided with four lead wires, and the sample for measurement was put at room temperature in an atmospheric environment or at a temperature of 900° C. in 4% of hydrogen and 96% of nitrogen. And measurement of an open pore ratio was conducted by an Archimedean principle using the above described sample for measurement.

(6) Evaluation of Performance of Power Generation (a Voltage Drop after Operation in Re-Reduction after Oxidization of an Anode) of a Single Cell A single cell was made by using an anode which was made in a method as described below and a cathode comprised of lanthanum strontium manganite (LSM) which was made with a predetermined composition in the same method as that of making an anode. An atmosphere of an anode of this single cell was adjusted to 5% humidified hydrogen, an atmosphere of a reference electrode to 1% oxygen and 99% argon, an atmosphere of a cathode to an atmosphere, and performance of power generation (a potential difference between an anode and a reference electrode) at 900° C. was measured in a three terminals method. Thereafter, an oxidizing and re-reduction cycle of an anode was conducted as follows, performance of power generation was evaluated in the same manner as the above described, and a ratio of a voltage drop after an oxidizing and re-reduction cycle of an anode was determined. Herein, as the oxidizing and re-reduction cycle, first once an anode side was purged with an argon gas, the anode was completely oxidized by blowing air for more than one hour to completely oxidize it, and again it was purged with an argon gas, and next the anode was subjected to re-reduction by blowing 5% humidified hydrogen.

[A Method for Making an Anode of Single Cell]

Figure 1:
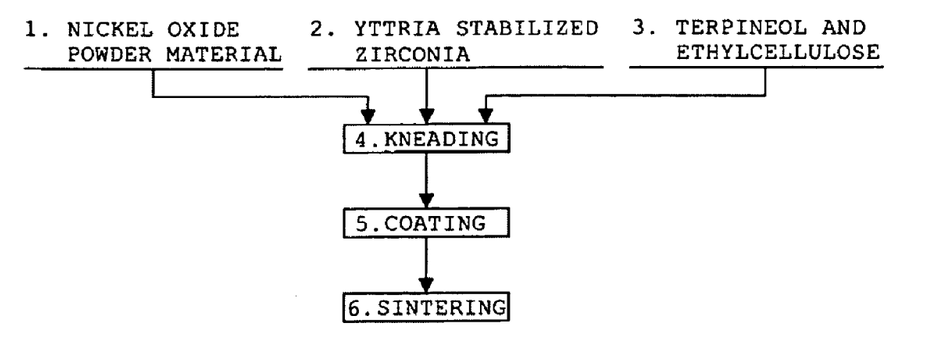
FIG. 1 is a flow sheet of a method for making an anode for evaluating power generation performance.

An anode for measurement was obtained in accordance with a flow diagram as shown in FIG. 1. FIG. 1 represents a flow diagram of a method for making an anode for evaluating performance of power generation. In FIG. 1, an anode material is obtained by weighing a nickel oxide powder material 1 and an yttria stabilized zirconia 2 so that a mass ratio is 65:35 and mixing with a mortar. Thereto, terpineol as a solvent and ethyl cellulose 3 as a thickener or as a substance contributing to a pore structure of an electrode is added at 5 mass % relative to the total mass of an anode material, and thereafter kneading 4 is conducted to obtain paste. Next, coating 5 of the paste is conducted on a sintered disc made of YSZ having a thickness of 0.5 mm so as to have an electrode area of 2 cm$^2$ with a screen printer, followed by heating at a rate of raising temperature of 10° C./min, and sintering 6 was conducted at 1500° C. for 3 hours to obtain an anode.

Example 1

As a raw material composition of a nickel oxide powder material, to 100 g of a raw material of a nickel oxide (NiO) powder having an average particle diameter of 0.6 μm and a specific surface area of 3.0 m$^2$/g, 0.1 g of a raw material of manganese oxide (MnO$_2$) powder was added, followed by mixing with a mortar to obtain a powder mixture containing a nickel oxide and a manganese oxide. A content of a manganese oxide relative to a nickel oxide in a powder mixture obtained was 0.1% by mass (manganese relative to the total amount of nickel is 0.086 mol %). Thereafter, according to the above described method of measuring a heat shrinkage percentage, a heat shrinkage percentage at 1400° C. was measured. Results are shown in Table 1. Further, according to the above described making of an anode material and a method of measuring of electric conductivity (specific resistance) and an open pore ratio thereof, an open pore ratio and specific resistance were determined. Results are shown in Table 1.

Example 2

As a raw material composition of a nickel oxide powder material, to 100 g of a raw material of a nickel oxide (NiO) powder having an average particle diameter of 0.6 μm and a specific surface area of 3.0 m$^2$/g, 0.5 g of a raw material of manganese oxide (MnO$_2$) powder was added, followed by mixing with a mortar to obtain a powder mixture containing a nickel oxide and a manganese oxide. A content of a manganese oxide relative to a nickel oxide in a powder mixture obtained was 0.5% by mass (manganese relative to the total amount of nickel is 0.43 mol %). Thereafter, according to the above described method of measuring a heat shrinkage percentage at 1400° C. was measured. Results are shown in Table 1. Further, according to the above described making of an anode material and a method of measuring of electric conductivity (specific resistance) and an open pore ratio thereof, an open pore ratio and specific resistance were determined. Results are shown in Table 1.

Example 3

As a raw material composition of a nickel oxide powder material, to 100 g of a raw material of a nickel oxide (NiO) powder having an average particle diameter of 0.6 μm and a specific surface area of 3.0 m$^2$/g, 1.0 g of a raw material of manganese oxide (MnO$_2$) powder was added, followed by mixing with a mortar to obtain a powder mixture containing a nickel oxide and a manganese oxide. A content of a manganese oxide relative to a nickel oxide in a powder mixture obtained was 1.0% by mass (manganese relative to the total amount of nickel is 0.85 mol %). Thereafter, according to the above described method of measuring a heat shrinkage percentage, a heat shrinkage percentage at 1400° C. was measured. Results are shown in Table 1. Further, according to the above described making of an anode material and a method of measuring of electric conductivity (specific resistance) and an open pore ratio thereof, an open pore ratio and specific resistance were determined. Results are shown in Table 1.

Next, using this raw material composition of a nickel oxide powder material, according to the description of the above described "evaluation of performance of power generation of a single cell", a single cell of using an anode obtained was made, and performance of power generation before oxidizing and after oxidizing and re-reduction were determined. Results are shown in Table 2.

Example 4

As a raw material composition of a nickel oxide powder material, to 100 g of a raw material of a nickel oxide (NiO) powder having an average particle diameter of 0.6 μm and a specific surface area of 3.0 m²/g, 2.0 g of a raw material of manganese oxide ($MnO_2$) powder was added, followed by mixing with a mortar to obtain a powder mixture containing a nickel oxide and a manganese oxide. A content of a manganese oxide relative to a nickel oxide in a powder mixture obtained was 2.0% by mass (manganese relative to the total amount of nickel is 1.7 mol %). Thereafter, according to the above described method of measuring a heat shrinkage percentage, a heat shrinkage percentage at 1400° C. was measured. Results are shown in Table 1. Further, according to the above described making of an anode material and a method of measuring of electric conductivity (specific resistance) and an open pore ratio thereof, an open pore ratio and specific resistance were determined. Results are shown in Table 1.

Example 5

As a raw material composition of a nickel oxide powder material, to 100 g of a raw material of a nickel oxide (NiO) powder having an average particle diameter of 0.6 μm and a specific surface area of 3.0 m²/g, 3.0 g of a raw material of manganese oxide ($MnO_2$) powder was added, followed by mixing with a mortar to obtain a powder mixture containing a nickel oxide and a manganese oxide. A content of a manganese oxide relative to a nickel oxide in a powder mixture obtained was 3.0% by mass (manganese relative to the total amount of nickel is 2.5 mol %). Thereafter, according to the above described method of measuring a heat shrinkage percentage, a heat shrinkage percentage at 1400° C. was measured. Results are shown in Table 1. Further, according to the above described making of an anode material and a method of measuring of electric conductivity (specific resistance) and an open pore ratio thereof, an open pore ratio and specific resistance were determined. Results are shown in Table 1.

Example 6

As a raw material composition of a nickel oxide powder material, to 100 g of a raw material of a nickel oxide (NiO) powder having an average particle diameter of 0.6 μm and a specific surface area of 3.0 m²/g, 4.0 g of a raw material of manganese oxide ($MnO_2$) powder was added, followed by mixing with a mortar to obtain a powder mixture containing a nickel oxide and a manganese oxide. A content of a manganese oxide relative to a nickel oxide in a powder mixture obtained was 4.0% by mass (manganese relative to the total amount of nickel is 3.3 mol %). Thereafter, according to the above described method of measuring a heat shrinkage percentage, a heat shrinkage percentage at 1400° C. was measured. Results are shown in Table 1. Further, according to the above described making of an anode material and a method of measuring of electric conductivity (specific resistance) and an open pore ratio thereof, an open pore ratio and specific resistance were determined. Results are shown in Table 1.

Example 7

As a raw material composition of a nickel oxide powder material, to 100 g of a raw material of a nickel oxide (NiO) powder having an average particle diameter of 0.6 μm and a specific surface area of 3.0 m²/g, 5.0 g of a raw material of manganese oxide ($MnO_2$) powder was added, followed by mixing with a mortar to obtain a powder mixture containing a nickel oxide and a manganese oxide. A content of a manganese oxide relative to a nickel oxide in a powder mixture obtained was 5.0% by mass (manganese relative to the total amount of nickel is 4.1 mol %). Thereafter, according to the above described method of measuring a heat shrinkage percentage, a heat shrinkage percentage at 1400° C. was measured. Results are shown in Table 1. In addition, according to the above described making of an anode material and a method of measuring of electric conductivity (specific resistance) and an open pore ratio thereof, an open pore ratio and specific resistance were determined. Results are shown in Table 1.

Comparative Example 1

By using a raw material of a nickel oxide (NiO) powder having an average particle diameter of 0.6 μm and a specific surface area of 3.0 m²/g, according to the above described method of measuring a heat shrinkage percentage, a heat shrinkage percentage at 1400° C. was measured. Result is shown in Table 1. Further, according to the above described making of an anode material and a method of measuring of electric conductivity (specific resistance) and an open pore ratio thereof, an open pore ratio and specific resistance were determined. Results are shown in Table 1.

Next, by using this raw material composition of a nickel oxide powder material, according to the description of the above described "Evaluation of performance of power generation of a single cell", a single cell using an anode obtained was made, and performance of power generation before oxidizing, and after an oxidizing and re-reduction cycle were determined. Results are shown in Table 2.

TABLE 1

| | | | | Specific resistance ($\mu\Omega \cdot cm$) | |
| | | Heat | | | |
| | Content of Mn (mol %) | shrinkage percentage (%) | Open pore ratio (%) | Atmosphere/ Room temperature | 4% $H_2$—$N_2$/ 900° C. |
|---|---|---|---|---|---|
| Example 1 | 0.086 | 13 | 20 | 62 | 380 |
| Example 2 | 0.43 | 13 | 20 | 64 | 373 |
| Example 3 | 0.85 | 11 | 21 | 64 | 390 |
| Example 4 | 1.7 | 11 | 19 | 64 | — |
| Example 5 | 2.5 | 11 | 21 | 68 | 409 |
| Example 6 | 3.3 | 11 | 20 | 67 | — |
| Example 7 | 4.1 | 10 | 21 | 68 | 460 |
| Comparative Example 1 | 0 | 17 | 23 | 66 | 420 |

TABLE 2

| | | Performance of power generation of unit cell (between fuel electrode and reference electrode) | | | | | |
|---|---|---|---|---|---|---|---|
| | | Current density (A/cm²) | | | | | |
| | | 0.1 | 0.2 | 0.3 | 0.35 | 0.4 | 0.5 |
| Example 3 | Before oxidizing (V) | 0.92 | 0.87 | 0.82 | 0.79 | 0.77 | 0.73 |
| | After one cycle (V) | 0.91 | 0.84 | 0.78 | 0.76 | 0.74 | 0.69 |
| Example 10 | Before oxidizing (V) | 0.92 | 0.87 | 0.81 | 0.78 | 0.76 | 0.72 |
| | After one cycle (V) | 0.88 | 0.83 | 0.76 | 0.74 | 0.72 | 0.68 |
| Comparative Example 1 | Before oxidizing (V) | 0.89 | 0.85 | 0.80 | 0.78 | 0.76 | 0.71 |
| | After one cycle (V) | 0.85 | 0.79 | 0.72 | 0.63 | * | * |

*: Measurement is impossible.

From Table 1, it is proved that since Examples 1 to 7 were conducted according to the present invention by using a raw composition of a nickel oxide powder material containing manganese which forms spinel compound with a nickel oxide, as an anode material used for a solid oxide fuel cell, a heat shrinkage percentage at 1400° C. is largely reduced to not higher than 13%. An open pore ratio is about 20%, and a bad influence is not given to a pore which is necessary for an electrode. And it is proved that a specific resistance is almost not changed from cases of an anode of a nickel oxide powder material not containing a metal element which forms spinel compound. On the contrary, in Comparative Examples 1, a metal element which forms spinel compound is not contained, and therefore a heat shrinkage percentage is high as 17%.

From Table 2, it is proved that since Example 3 was conducted according to the present invention by using a raw composition of a nickel oxide powder material containing manganese which forms spinel compound with a nickel oxide, as an anode material used for a solid oxide fuel cell, a potential difference between a reference electrode and an anode at current density of 0.5 A/cm² was 0.73 V. Successively, after the above described measurement of performance of power generation, an anode side was oxidized and then subjected to re-reduction and performance of power generation was again evaluated, and it is proved that a potential difference between a reference electrode and an anode at current density of 0.5 A/cm² was 0.69 V.

On the contrary, in Comparative Examples 1, concerning performance of power generation, at current density of 0.5 A/cm² a potential difference between a reference electrode and an anode at current density of 0.5 A/cm² was 0.71 V, but after the above described measurement of performance of power generation, when an anode side was oxidized and then subjected to re-reduction and performance of power generation was again evaluated, a potential difference between a reference electrode and an anode at current density of 0.35 A/cm² was only 0.63 V, and electric current could no longer be taken out at current density of not lower than 0.4 A/cm².

Example 8

As a raw material composition of a nickel oxide powder material, 100 g of a raw material of a nickel oxide (NiO) powder having an average particle diameter of 0.8 μm and 0.1 g of di-ferric trioxide ($Fe_2O_3$) powder having an average particle diameter of 0.4 μm were wet blended with a ball mill using PSZ balls having a diameter of 2 mm by using ethanol as a solvent. A powder mixture obtained was dried with an atmospheric dryer of 105° C., and thereafter was disintegrated to obtain a powder mixture containing a nickel oxide and di-ferric trioxide. A content of di-ferric trioxide relative to a nickel oxide in a powder mixture obtained was 0.1% by mass (iron relative to the total amount of nickel is 0.093 mol %). Thereafter, according to the above described method of measuring a heat shrinkage percentage, a heat shrinkage percentage at 1400° C. was measured. Results are shown in Table 3. Further, according to the above described making of an anode material and a method of measuring of electric conductivity (specific resistance) thereof, electric conductivity was determined. Results are shown in Table 3.

Example 9

As a raw material composition of a nickel oxide powder material, 100 g of a raw material of a nickel oxide (NiO) powder having an average particle diameter of 0.8 μm and 0.5 g of di-ferric trioxide ($Fe_2O_3$) powder having an average particle diameter of 0.4 μm were wet blended with a ball mill using PSZ balls having a diameter of 2 mm by using ethanol as a solvent. A powder mixture obtained was dried with an atmospheric dryer of 105° C., and thereafter was disintegrated to obtain a powder mixture containing a nickel oxide and di-ferric trioxide. A content of di-ferric trioxide relative to a nickel oxide in a powder mixture obtained was 0.5% by mass (iron relative to the total amount of nickel is 0.47 mol %). Thereafter, according to the above described method of measuring a heat shrinkage percentage, a heat shrinkage percentage at 1400° C. was measured. Results are shown in Table 3. Further, according to the above described making of an anode material and a method of measuring of electric conductivity (specific resistance) thereof, electric conductivity was determined. Results are shown in Table 3.

Example 10

As a raw material composition of a nickel oxide powder material, 100 g of a raw material of a nickel oxide (NiO) powder having an average particle diameter of 0.8 μm and 1.0 g of di-ferric trioxide ($Fe_2O_3$) powder having an average particle diameter of 0.4 μm were wet blended with a ball mill using PSZ balls having a diameter of 2 mm by using ethanol as a solvent. A powder mixture obtained was dried with an atmospheric dryer of 105° C., and thereafter was disintegrated to obtain a powder mixture containing a nickel oxide and di-ferric trioxide. A content of di-ferric trioxide relative to a nickel oxide in a powder mixture obtained was 1.0% by mass (iron relative to the total amount of nickel is 0.93 mol %). Thereafter, according to the above described method of measuring a heat shrinkage percentage, a heat shrinkage percentage at 1400° C. was measured. Results are shown in Table 3. Further, according to the above described making of an anode material and a method of measuring of electric conductivity (specific resistance) thereof, electric conductivity was determined. Results are shown in Table 3.

Next, by using this raw material composition of a nickel oxide powder material, according to the description of the above described "Evaluation of performance of power generation of a single cell", a single cell using an anode obtained was made, and performance of power generation before oxidizing, and after an oxidizing and re-reduction cycle were determined. Results are shown in Table 2. From Table 2, it has been proved that potential differences between a reference electrode and an anode at current density of 0.5 A/cm$^2$ were respectively 0.72 and 0.68 V, and favorable performance of power generation is exhibited.

Example 11

As a raw material composition of a nickel oxide powder material, 100 g of a raw material of a nickel oxide (NiO) powder having an average particle diameter of 0.8 μm and 2.0 g of di-ferric trioxide ($Fe_2O_3$) powder having an average particle diameter of 0.4 μm were wet blended with a ball mill using PSZ balls having a diameter of 2 mm by using ethanol as a solvent. A powder mixture obtained was dried with an atmospheric dryer of 105° C., and thereafter was disintegrated to obtain a powder mixture containing a nickel oxide and di-ferric trioxide. A content of di-ferric trioxide relative to a nickel oxide in a powder mixture obtained was 2.0% by mass (iron relative to the total amount of nickel is 1.8 mol %). Thereafter, according to the above described method of measuring a heat shrinkage percentage, a heat shrinkage percentage at 1400° C. was measured. Results are shown in Table 3. Further, according to the above described making of an anode material and a method of measuring of electric conductivity (specific resistance) thereof, electric conductivity was determined. Results are shown in Table 3.

Example 12

As a raw material composition of a nickel oxide powder material, 100 g of a raw material of a nickel oxide (NiO) powder having an average particle diameter of 0.8 μm and 5.0 g of di-ferric trioxide ($Fe_2O_3$) powder having an average particle diameter of 0.4 μm were wet blended with a ball mill using PSZ balls having a diameter of 2 mm by using ethanol as a solvent. A powder mixture obtained was dried with an atmospheric dryer of 105° C., and thereafter was disintegrated to obtain a powder mixture containing a nickel oxide and di-ferric trioxide. A content of di-ferric trioxide relative to a nickel oxide in a powder mixture obtained was 5.0% by mass (iron relative to the total amount of nickel is 4.5 mol %). Thereafter, according to the above described method of measuring a heat shrinkage percentage, a heat shrinkage percentage at 1400° C. was measured. Results are shown in Table 3. Further, according to the above described making of an anode material and a method of measuring of electric conductivity (specific resistance) thereof, electric conductivity was determined. Results are shown in Table 3.

Example 13

As a raw material composition of a nickel oxide powder material, 100 g of a raw material of a nickel oxide (NiO) powder having an average particle diameter of 0.8 μm and 10 g of di-ferric trioxide ($Fe_2O_3$) powder having an average particle diameter of 0.4 μm were wet blended with a ball mill using PSZ balls having a diameter of 2 mm by using ethanol as a solvent. A powder mixture obtained was dried with an atmospheric dryer of 105° C., and thereafter was disintegrated to obtain a powder mixture containing a nickel oxide and di-ferric trioxide. A content of di-ferric trioxide relative to a nickel oxide in a powder mixture obtained was 10% by mass (iron relative to the total amount of nickel is 8.6 mol %). Thereafter, according to the above described method of measuring a heat shrinkage percentage, a heat shrinkage percentage at 1400° C. was measured. Results are shown in Table 3. Further, according to the above described making of an anode material and a method of measuring of electric conductivity (specific resistance) thereof, electric conductivity was determined. Results are shown in Table 3.

Comparative Example 2

By using a raw material of a nickel oxide (NiO) powder having an average particle diameter of 0.8 μm, according to the above described method of measuring a heat shrinkage percentage, a heat shrinkage percentage at 1400° C. was measured. Result is shown in Table 3. Further, according to the above described making of an anode material and a method of measuring of electric conductivity (specific resistance), electric conductivity was determined. Results are shown in Table 3.

TABLE 3

|  | Content of Fe (mol %) | Heat shrinkage percentage (%) | Electric conductivity (S/cm) | |
|---|---|---|---|---|
|  |  |  | Atmosphere/ Room temperature | 4% $H_2$—$N_2$/ 900° C. |
| Example 8 | 0.093 | 12.3 | — | — |
| Example 9 | 0.47 | 11.9 | 15200 | 2400 |
| Example 10 | 0.93 | 10.1 | 11600 | 2190 |
| Example 11 | 1.8 | 10.8 | 11500 | 2160 |
| Example 12 | 4.5 | 11.0 | 11200 | 2110 |
| Example 13 | 8.6 | 10.8 | 10300 | 1910 |
| Comparative Example 2 | 0 | 16.6 | 11900 | 2140 |

From Table 3, it is proved that since Examples 8 to 13 were conducted according to the present invention by using a raw composition of a nickel oxide powder material containing iron which forms spinel compound with a nickel oxide, as an anode material used for a solid oxide fuel cell, a heat shrinkage percentage at 1400° C. is largely reduced to not higher than 13%. And it is proved that electric conductivity is almost not changed from cases of an anode of a nickel oxide powder material not containing a metal element which forms spinel compound.

On the contrary, in Comparative Examples 2, a metal element which forms spinel compound is not contained, and therefore a heat shrinkage percentage is high.

Example 14

To 20 kg of a raw material of a nickel oxide (NiO) powder having an average particle diameter of 0.6 μm and a specific surface area of 3.0 m$^2$/g, 200 g of a raw material of chromium oxide ($Cr_2O_3$) powder (a content ratio of Cr relative to the total amount of Ni corresponds to 0.98 mol %) was added, followed by mixing with a V blender and thereafter by calcining at 900° C. to obtain a nickel oxide powder material containing chromium as spinel compound. Using a nickel oxide powder material obtained, according to the above described "A method for making an anode", an anode was made. Thereafter, according to the above described evaluation method of performance of power generation of a single cell, a single cell was made, and performance of power generation was evaluated, and a potential difference between a reference electrode and an anode before oxidizing and after an oxidizing and re-reduction cycle (after one cycle), and voltage drop percentage were determined therefrom. Results are shown in Table 4.

Example 151

To 100 g of a raw material of a nickel oxide (NiO) powder having an average particle diameter of 0.6 μm and a specific surface area of 3.0 $m^2/g$, 1 g of a raw material of manganese oxide ($MnO_2$) powder (a content ratio of Mn relative to the total amount of Ni corresponds to 0.85 mol %) was added, followed by mixing with a ball mill and thereafter by calcining at 900° C. to obtain a nickel oxide powder material containing manganese as spinel compound. Using a nickel oxide material obtained, according to the above described "A method for making an anode", an anode was made. Thereafter, according to the above described evaluation method of performance of power generation of a single cell, a single cell was made, and performance of power generation was evaluated, and a potential difference between a reference electrode and an anode before oxidizing and after an oxidizing and re-reduction cycle (after one cycle), and voltage drop percentage were determined therefrom. Results are shown in Table 4.

Example 16

The same procedure as Example 15 was conducted except that two cycles of an oxidizing and re-reduction cycle were conducted on evaluating performance of power generation of a single cell, and a potential difference between a reference electrode and an anode before oxidizing and after an oxidizing and re-reduction cycle (after two cycles), and voltage drop percentage were determined therefrom. Results are shown in Table 4.

Example 17

The same procedure as Example 15 was conducted except that three cycles of an oxidizing and re-reduction cycle were conducted on evaluating performance of power generation of a single cell, and a potential difference between a reference electrode and an anode before oxidizing and after an oxidizing and re-reduction cycle (after three cycles), and voltage drop percentage were determined therefrom. Results are shown in Table 4.

Comparative Example 3

In the same procedure as Example 14 except that a raw material of a nickel oxide powder not containing a metal element which forms spinel compound with a nickel oxide was used, a single cell was made. Thereafter, according to the above described evaluation method of performance of power generation of a single cell, a single cell was made, and performance of power generation was evaluated, and a potential difference between a reference electrode and an anode before oxidizing and after an oxidizing and re-reduction, and voltage drop percentage were determined therefrom. Results are shown in Table 4.

Comparative Example 4

The same procedure as Comparative Example 3 was conducted except that two cycles of an oxidizing and re-reduction cycle were conducted on evaluating performance of power generation of a single cell, and a potential difference between a reference electrode and an anode before oxidizing and after an oxidizing and re-reduction cycle (after two cycles), and voltage drop percentage were determined therefrom. Results are shown in Table 4.

TABLE 4

| | Nickel oxide powder material | | Performance of power generation of unit cell (between fuel electrode and reference electrode) | | | | | |
|---|---|---|---|---|---|---|---|---|
| | | | Current density (A/cm$^2$) | | | | | |
| | | | 0.1 | 0.2 | 0.3 | 0.35 | 0.4 | 0.5 |
| Example 14 | Containing Cr | Before oxidizing (V) | 0.90 | 0.85 | 0.82 | 0.80 | 0.78 | 0.75 |
| | | After one cycle (V) | 0.88 | 0.84 | 0.80 | 0.78 | 0.76 | 0.72 |
| | | Voltage drop percentage (%) | 2.2 | 1.2 | 2.4 | 2.5 | 2.6 | 4.0 |
| Example 15 | Containing Mn | Before oxidizing (V) | 0.93 | 0.87 | 0.82 | 0.80 | 0.78 | 0.75 |
| | | After one cycle (V) | 0.92 | 0.87 | 0.82 | 0.80 | 0.77 | 0.73 |
| | | Voltage drop percentage (%) | 1.1 | 0 | 0 | 0 | 1.3 | 2.7 |
| Example 16 | Containing Mn | Before oxidizing (V) | 0.93 | 0.87 | 0.82 | 0.80 | 0.78 | 0.75 |
| | | After two cycles (V) | 0.91 | 0.87 | 0.82 | 0.80 | 0.77 | 0.72 |
| | | Voltage drop percentage (%) | 2.2 | 0 | 0 | 0 | 1.3 | 4.0 |
| Example 17 | Containing Mn | Before oxidizing (V) | 0.93 | 0.87 | 0.82 | 0.80 | 0.78 | 0.75 |
| | | After three cycles (V) | 0.90 | 0.85 | 0.81 | 0.79 | 0.77 | 0.71 |
| | | Voltage drop percentage (%) | 3.2 | 2.3 | 1.2 | 1.3 | 1.3 | 5.3 |
| Comparative Example 3 | No addition | Before oxidizing (V) | 0.93 | 0.90 | 0.87 | 0.85 | 0.82 | 0.79 |
| | | After one cycle (V) | 0.92 | 0.88 | 0.84 | 0.82 | 0.79 | 0.75 |
| | | Voltage drop percentage (%) | 1.1 | 2.2 | 3.4 | 3.5 | 4.8 | 5.1 |
| Comparative Example 4 | No addition | Before oxidizing (V) | 0.93 | 0.90 | 0.87 | 0.85 | 0.82 | 0.79 |
| | | After two cycles (V) | 0.92 | 0.88 | 0.83 | 0.81 | 0.79 | 0.74 |
| | | Voltage drop percentage (%) | 1.1 | 2.2 | 4.6 | 4.7 | 4.8 | 6.3 |

From Table 4, it is proved that since Example 14 or 15 was conducted according to the present invention by using a nickel oxide powder material containing chromium or manganese, which forms spinel compound with a nickel oxide, as an anode material used for a solid oxide fuel cell, voltage drop percentage after one cycle in an oxidizing and re-reduction cycle of an anode can be decreased to not higher than 5% within a current density of not higher than 0.5 A/cm$^2$.

In other words, when an addition ratio of a chromium oxide is 1% by mass relative to a nickel oxide (a content ratio of Cr relative to the total amount of Ni corresponds to 0.98 mol %), a potential difference between a reference electrode and an anode before oxidizing was 0.75 to 0.90 V to a current density of 0.5 A/cm$^2$, which shows favorable performance of power generation, and a potential difference between a reference electrode and an anode after an oxidizing and re-reduction cycle was 0.72 V even at a current density of 0.5 A/cm$^2$. On this occasion, voltage drop percentage was suppressed to be low and almost constant to a current density of 0.4 A/cm$^2$, and voltage drop percentage was restrained to 4% even at that of 0.5 A/cm$^2$. Further, when an addition amount of a manganous oxide is 1% by mass relative to a nickel oxide (a content ratio of Mn relative to Ni corresponds to 0.85 mol %), a potential difference between a reference electrode and an anode before oxidizing was 0.75 to 0.93 V to a current density of 0.5 A/cm$^2$, which shows favorable performance of power generation, and a potential difference between a reference electrode and an anode after an oxidizing and re-reduction cycle was 0.73 V even at a current density of 0.5 A/cm$^2$. On this occasion, voltage drop percentage was suppressed to be low and almost constant to a current density of 0.4 A/cm$^2$, and voltage drop percentage was restrained to 2.7% even at that of 0.5 A/cm$^2$.

In addition, it is proved that since Example 16 or 17 was conducted according to the present invention by using a nickel oxide powder material containing manganese, which forms spinel compound with a nickel oxide, as an anode material used for a solid oxide fuel cell, voltage drop percentage after multiple times of cycle in an oxidizing and re-reduction cycle of an anode can be reduced as compared with results of multiple times of cycle with a conventional material (for example, see Comparative Example 4). In other words, when an oxidizing and re-reduction cycle of an anode was repeated totally for three times, a potential difference between a reference electrode and an anode after an oxidizing and re-reduction cycle was 0.71 V even at a current density of 0.5 A/cm$^2$. On this occasion, voltage drop percentage after three cycles was suppressed to be low and almost constant to a current density of 0.4 A/cm$^2$, and voltage drop percentage was restrained to 5.3% even at that of 0.5 A/cm$^2$.

On the contrary, it is proved that since in Comparative Example 3 or 4, a nickel oxide powder does not meet these requirements, voltage drop percentage after an oxidizing and re-reduction cycle of an anode is high, and a satisfactory result cannot be obtained. Namely, a potential difference between a reference electrode and an anode operation in re-reduction atmosphere after oxidization of the anode (RedOx one cycle) was 0.75 V at a current density of 0.5 A/cm$^2$. On this occasion, voltage drop percentage was continuously raised till a current density of 0.5 A/cm$^2$, and the voltage drop percentage became 5.1% at that of 0.5 A/cm$^2$. Moreover, a potential difference between a reference electrode and an anode operation in re-reduction atmosphere after two oxidization of the anode (RedOx two cycle) was 0.74 V at a current density of 0.5 A/cm$^2$. On this occasion, voltage drop percentage was continuously raised till a current density of 0.5 A/cm$^2$, and the voltage drop percentage became further worsened to 6.3% at that of 0.5 A/cm$^2$.

As apparent from the above, a nickel oxide powder material according to the present invention used for a solid oxide fuel cell is suitable as a nickel oxide powder material used for an anode material utilized in a solid oxide fuel cell. In addition, a nickel oxide powder material according to the present invention, since it forms fine metal nickel in a reducing atmosphere, can be applied in the fields of materials for an electrode of a fuel battery which functions at a lower temperature than a solid oxide fuel cell of the present status, and further of nickel-based catalysts such as for generating a hydrogen gas and the like.

What is claimed is:

1. A nickel oxide powder material used in an anode material constituting a solid oxide fuel cell, characterized in that spinel compound represented by a compositional formula $NiM_2O_4$ is formed inside or on the surface of said nickel oxide powder or at the interface between the powder particles, wherein M represents at least one metal element selected from the group consisting of Cr and Mn; M is an amount sufficient for restraining deterioration of a microstructure when it is used as the anode material; a content ratio of said metal element (M) is 0.01 to 5 mol % relative to the total amount of nickel and a heat shrinkage percentage at 1400° C. of pellets, obtainable by pressure molding said nickel oxide powder material, is significantly decreased.

2. The nickel oxide powder material according to claim 1, characterized in that, when said metal element (M) is Mn, the heat shrinkage percentage at 1400° C., of pellets obtainable by pressure molding said nickel oxide powder material, is 10 to 13%.

3. An anode material for use in a solid oxide fuel cell, comprising of solid electrolyte and a nickel oxide powder material according to claim 1.

4. The anode material for use in a solid oxide fuel cell according to claim 3, characterized in that a formulation ratio of a nickel oxide powder material and a solid electrolyte (a nickel oxide powder material: a solid electrolyte) is 30 to 70:70 to 30 in a mass ratio.

5. The anode material for use in a solid oxide fuel cell according to claim 3, characterized in that a voltage drop percentage during its operation in re-reduction atmosphere after oxidization of the anode material is not higher than 5%.

6. The nickel oxide powder material according to claim 1, characterized in that said metal element (M) is Mn.

7. The nickel oxide powder material according to claim 1, characterized in that said metal element (M) is Cr.

8. The nickel oxide powder material according to claim 1, characterized in that a particle diameter of a nickel oxide powder is not higher than 1 μm.

* * * * *